(12) United States Patent
De Carvalho et al.

(10) Patent No.: US 7,916,745 B2
(45) Date of Patent: Mar. 29, 2011

(54) APPARATUS AND METHOD FOR AUTOMATIC REPEAT REQUEST IN MULTI INPUT MULTI OUTPUT SYSTEM

(75) Inventors: Elisabeth De Carvalho, Aalborg (DK); Petar Popovski, Aalborg (DK); Seung-Hoon Park, Seoul (KR); David Mazzarese, Suwon-si (KR); Hyun-kyu Yu, Seoul (KR); Sung-Kwon Hong, Seoul (KR); Ho-Kyu Choi, Seongnam-si (KR); Dong-Seek Park, Yongin-si (KR); Young-Kyun Kim, Yongin-si (KR)

(73) Assignee: Samsung Electronics Co., Ltd (KR)

(*) Notice: Subject to any disclaimer, the term of this patent is extended or adjusted under 35 U.S.C. 154(b) by 770 days.

(21) Appl. No.: 11/900,755

(22) Filed: Sep. 13, 2007

(65) Prior Publication Data
US 2008/0062915 A1    Mar. 13, 2008

(30) Foreign Application Priority Data
Sep. 13, 2006  (KR) .................... 10-2006-0088476

(51) Int. Cl.
  *H04J 3/16* (2006.01)
(52) U.S. Cl. .................................... 370/437; 370/465

(58) Field of Classification Search .............. None
See application file for complete search history.

(56) References Cited

U.S. PATENT DOCUMENTS

| | | | |
|---|---|---|---|
| 6,192,256 B1* | 2/2001 | Whinnett | 455/562.1 |
| 7,715,488 B2* | 5/2010 | Pedersen et al. | 375/267 |
| 2005/0254477 A1* | 11/2005 | Lee et al. | 370/342 |
| 2006/0107167 A1 | 5/2006 | Jeong et al. | |
| 2006/0182199 A1* | 8/2006 | Hong et al. | 375/299 |
| 2007/0032206 A1* | 2/2007 | Hwang et al. | 455/101 |
| 2007/0036249 A1* | 2/2007 | Shatara et al. | 375/347 |
| 2008/0123583 A1* | 5/2008 | Shiizaki et al. | 370/315 |
| 2009/0252236 A1 | 10/2009 | Li et al. | |

FOREIGN PATENT DOCUMENTS

| | | |
|---|---|---|
| KR | 102006005526 | 5/2006 |
| KR | 1020070086267 | 8/2007 |
| WO | WO 2006/064857 | 6/2006 |

* cited by examiner

*Primary Examiner* — Phirin Sam
(74) *Attorney, Agent, or Firm* — The Farrell Law Firm, P.C.

(57) ABSTRACT

An apparatus and method for Automatic Repeat reQuest (ARQ) in a Multi Input Multi Output (MIMO) system. The method includes computing weights of erroneous packets and weights of transmitting antennas by using channel information; sorting the weights of the erroneous packets in descending order; sorting the weights of the transmitting antennas in ascending order; and assigning the transmitting antennas to the erroneous packets according to sorting results.

19 Claims, 7 Drawing Sheets

APPARATUS AND METHOD FOR AUTOMATIC REPEAT REQUEST IN MULTI INPUT MULTI OUTPUT SYSTEM

PRIORITY

This application claims priority under 35 U.S.C. §119(a) to a Korean patent application filed in the Korean Intellectual Property Office on Sep. 13, 2006 and assigned Serial No. 2006-88476, the disclosure of which is hereby incorporated by reference.

BACKGROUND OF THE INVENTION

1. Field of the Invention

The present invention generally relates to a Multi Input Multi Output (MIMO) system. More particularly, the present invention relates to an apparatus and method for Automatic Repeat reQuest (ARQ) in a MIMO system.

2. Description of the Related Art

In MIMO systems, data is transmitted by using either spatial multiplexing or space-time coding. When using the spatial multiplexing, two or more data streams are simultaneously transmitted through a plurality of antennas included in a transmitting end and a receiving end. When using the space-time coding, a suitable code is combined with a data stream, and the resultant data stream is transmitted through the plurality of antennas over certain time periods. For example, in a 2×2 MIMO system, a transmitting end has two transmitting antennas and signals are transmitted through the two transmitting antennas. Then, a receiving end receives the signals so two data streams can be transmitted and received within one time period. When using an Alamouti code, the transmitting end transmits two data streams within two time periods through the two transmitting antennas, and thus a diversity gain can be obtained, thereby reducing an error rate.

According to an ARQ scheme, a transmitting end retransmits data when an error is detected from the data while the data is received by a receiving end. In particular, a Hybrid ARQ (HARQ) scheme combines an ARQ scheme and a coding scheme. With a HARQ scheme, when an error is detected from data transmitted in a previous time period, the erroneous data is stored rather than discarded, and when retransmitted, the data is combined with the previously transmitted data. This can increase probability of successful data reception. To detect errors, data packets are transmitted using a Cyclic Redundancy Check (CRC) code.

The receiving end detects errors by using a CRC code from a received packet and feeds back an acknowledgement/non-acknowledgement (ACK/NACK) signal to the transmitting end. Specifically, if no error is detected from the received packet, the ACK signal is fed back. Otherwise, the NACK signal is fed back. The transmitting end transmits a new packet to the receiving end in response to the ACK signal, and transmits the error detected signal to the receiving end in response to the NACK signal.

Unlike a Single Input Single Output (SISO) system, a MIMO system transmits two or more data streams at the same time. Therefore, in addition to an ACK/NACK signal, a stream identifier bit is also fed back to distinguish an error detected data stream. In the receiving end, a receiving filter is configured by using a pilot signal according to an antenna. When a signal is transmitted from an antenna, an output unit of the receiving filter can recognize the antenna from which the signal is transmitted. Therefore, the receiving end can recognize an error status of data streams.

In a conventional MIMO system employing an ARQ scheme, when an error is detected from a packet, the packet is retransmitted through the previously used antenna without having to select another antenna. Alternatively, all packets are retransmitted including the error detected packet by using another antenna. Since there is no method for selecting a specific antenna assigned to an error detected packet, a need exists for a method in which the error detected packet is retransmitted by selecting an antenna assigned for that packet.

SUMMARY OF THE INVENTION

The present invention addresses at least the above-mentioned problems and/or disadvantages and provides at least the advantages described below. Accordingly, an aspect of the present invention is to provide an apparatus and method for ARQ in a MIMO system.

According to an aspect of the present invention, a method of selecting a retransmission antenna in a MIMO system is provided. The method includes computing weights of erroneous packets and weights of transmitting antennas by using channel information; sorting the weights of the erroneous packets in descending order; sorting the weights of the transmitting antennas in ascending order; and assigning the transmitting antennas to the erroneous packets according to sorting results.

According to another aspect of the present invention, an apparatus for selecting a retransmission antenna in a MIMO system is provided. The apparatus includes a CRC detector for detecting an error from an input packet; and an ARQ transmitter for computing weights of erroneous packets and weights of transmitting antennas by using channel information, for sorting the weights of the erroneous packets in descending order, for sorting the weights of the transmitting antennas in ascending order, for assigning the transmitting antennas to the erroneous packets according to sorting results, and for transmitting information on the antenna assignment to a transmitting end.

BRIEF DESCRIPTION OF THE DRAWINGS

The above and other aspects, features and advantages of certain exemplary embodiments of the present invention will become more apparent from the following detailed description when taken in conjunction with the accompanying drawings in which.

DETAILED DESCRIPTION OF THE PREFERRED EMBODIMENTS

Preferred embodiments of the present invention are described below with reference to the accompanying drawings. In the following description, well-known functions or constructions are not described in detail since they would obscure the invention in unnecessary detail.

An apparatus and method for Automatic Repeat reQuest (ARQ) in a Multi Input Multi Output (MIMO) system of the present invention will now be described. It will be assumed hereinafter that an $N_A \times N_A$ MIMO system is used, a communication channel does not change within a maximum retransmission time period of ARQ, and a maximum retransmission number of ARQ is limited to 4.

Figure 1:
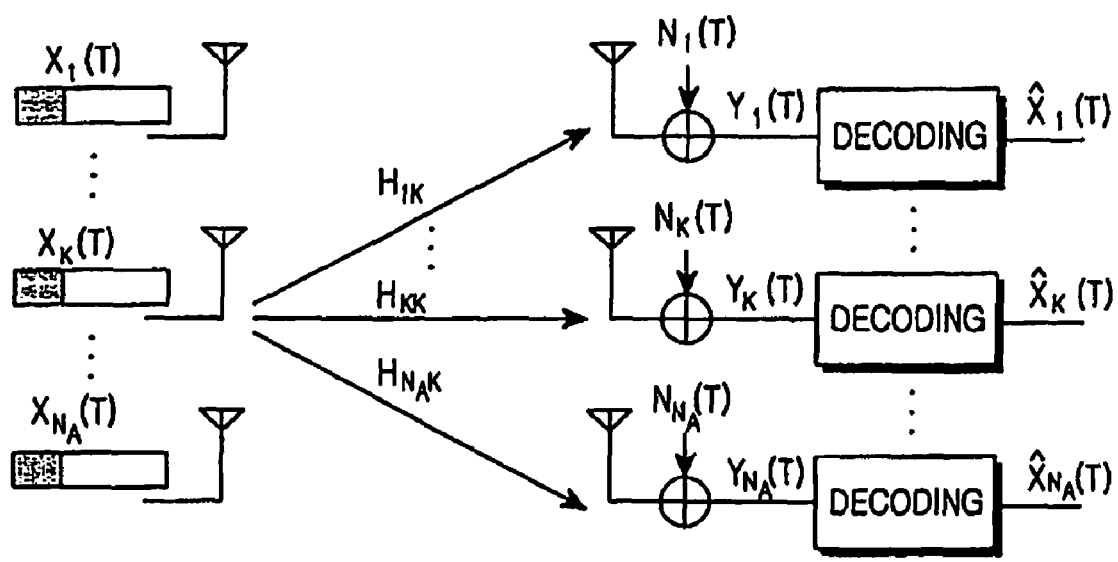
FIG. 1 illustrates a concept of data communication in an $N_A \times N_A$ MIMO system according to the present invention.

FIG. 1 illustrates a concept of data communication in an $N_A \times N_A$ MIMO system according to the present invention.

Referring to FIG. 1, in the $N_A \times N_A$ MIMO system, a transmitting end transmits $N_A$ signals to a receiving end through $N_A$ transmitting antennas at time t. The signals are transmitted to the receiving end through a channel H. The signals are then received by the receiving end through receiving antennas and are decoded to detect original signals.

Such data communication carried out in the $N_A \times N_A$ MIMO system can be expressed by Equation (1) below.

$$Y(t) = HX(t) + N(t), \quad (1)$$

$$X(t) = \begin{bmatrix} X_1(t) \\ \vdots \\ X_{N_A}(t) \end{bmatrix}, Y(t) = \begin{bmatrix} Y_1(t) \\ \vdots \\ Y_{N_A}(t) \end{bmatrix},$$

$$H = \begin{bmatrix} h_{11} & \cdots & h_{1N_A} \\ \vdots & \ddots & \vdots \\ h_{N_A 1} & \cdots & h_{N_A N_A} \end{bmatrix}, N(t) = \begin{bmatrix} N_1(t) \\ \vdots \\ N_{N_A}(t) \end{bmatrix}$$

In Equation (1), t denotes a packet index in the time axis, and $N_A$ denotes the number of transmitting antennas (or receiving antennas). $X_i(t)$ denotes a packet transmission signal transmitted using an $i^{th}$ transmitting antenna at time t. $Y_j(t)$ denotes a packet reception signal received using a $j^{th}$ receiving antenna at time t. H denotes an $N_A \times N_A$ MIMO channel. $N_j(t)$ denotes a white noise of a $j^{th}$ receiving antenna at time t. $X_i(t)$ can be expressed by $X_i(t) = [x_1^{(i)}(t) \ldots x_{N_A}^{(i)}(t)]$, where $x_k^{(i)}(t)$ denotes a transmission symbol. A dispersion of the transmission symbol can be represented by $\sigma_x^2$. $N_j(t)$ can be expressed by $N_j(t) = [n_1^{(j)}(t) \ldots n_{N_A}^{(j)}(t)]$, where $n_k^{(j)}(t)$ denotes a noise sample of the dispersion $\sigma_x^2$. H can be expressed by $H = [H_1 \ldots H_{N_A}]$. A channel $H_k$ from a $j^{th}$ transmitting antenna to a plurality of receiving antennas $1, \ldots,$ and $N_A$ can be expressed by $$H_k = \begin{bmatrix} h_{1k} \\ \vdots \\ h_{N_A K} \end{bmatrix},$$

where $h_{ji}$ denotes a channel coefficient from an $i^{th}$ transmitting antenna to a $j^{th}$ receiving antenna. In FIG. 1, $\hat{X}_i(t)$ denotes a signal obtained by decoding the signal $X_i(t)$ at time t.

Figure 2A:
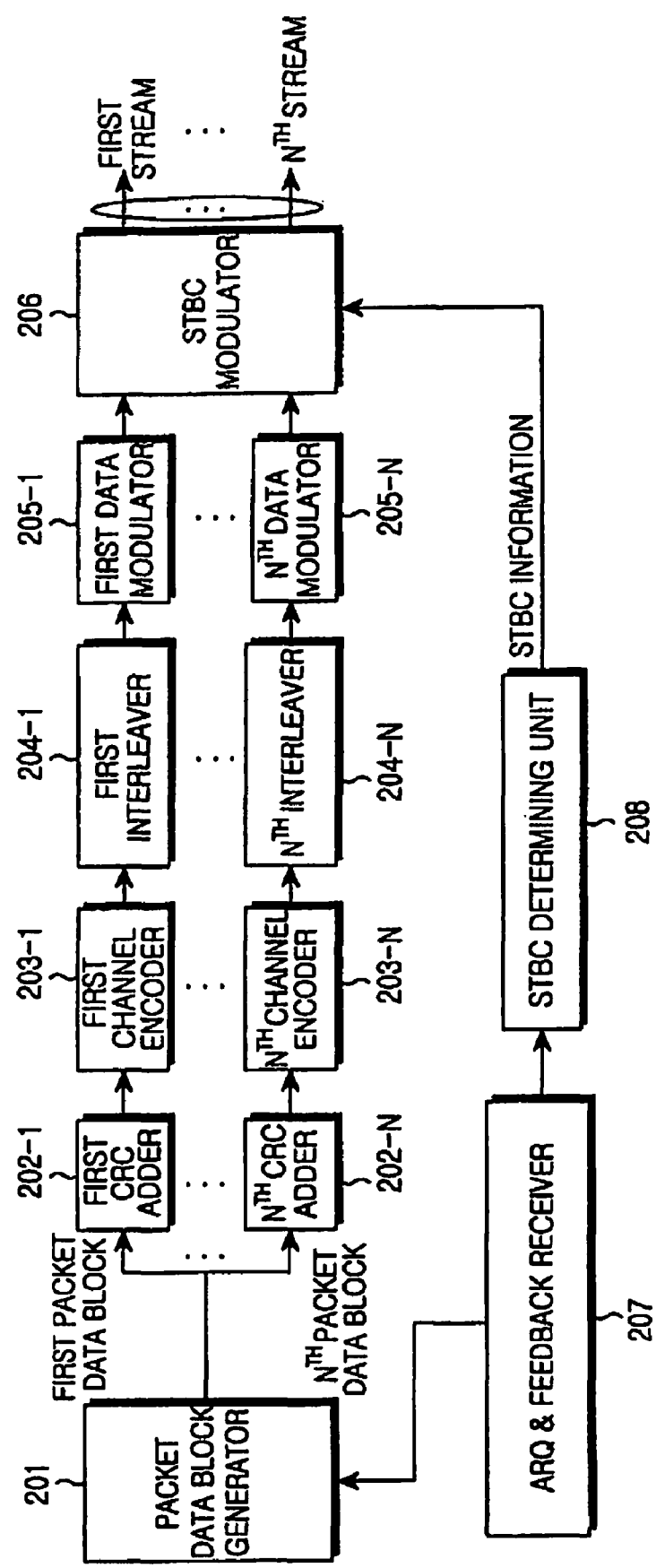
FIGS. 2A and 2B are block diagrams illustrating a transmitting end and a receiving end in a MIMO system according to the present invention.
Figure 2B:
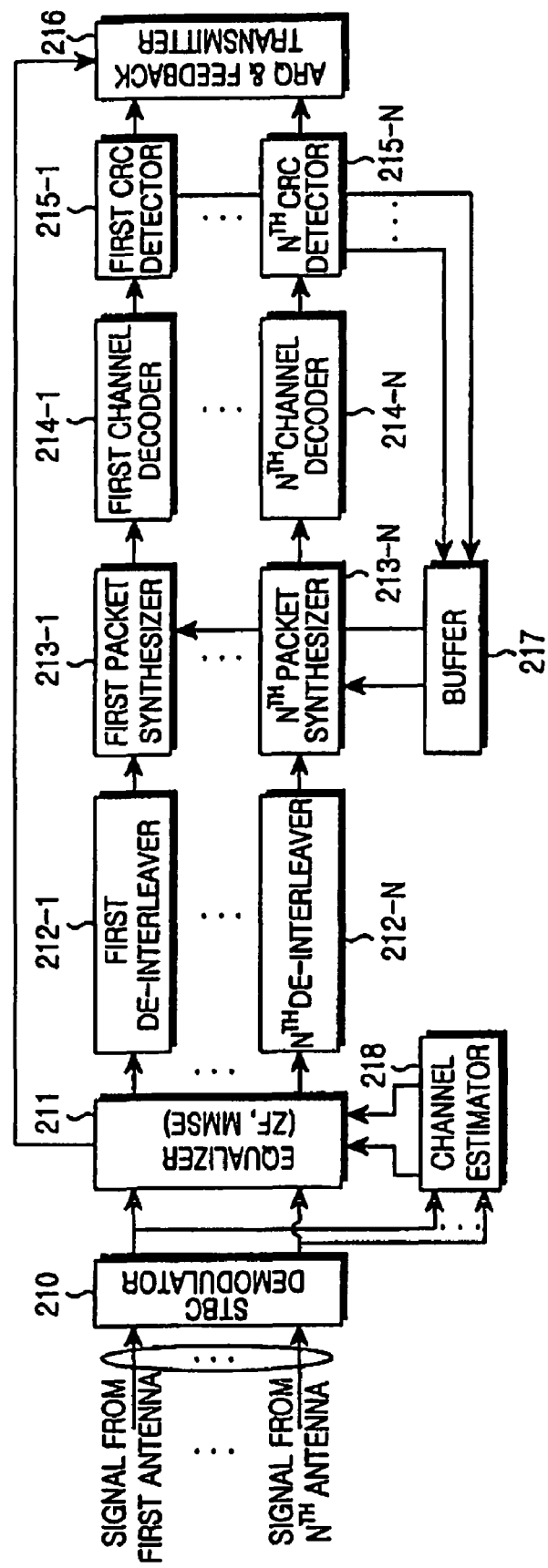

FIGS. 2A and 2B show a transmitting end and a receiving end, respectively, in a MIMO system according to the present invention. The transmitting end of FIG. 2A includes a packet data block generator 201, first to $n^{th}$ Cyclic Redundancy Check (CRC) adders 202-1 to 202-N, first to $n^{th}$ channel encoders 203-1 to 203-N, first to $n^{th}$ interleavers 204-1 to 204-N, first to $n^{th}$ data modulators 205-1 to 205-N, a Space-Time Block Code (STBC) modulator 206, an ARQ & feedback receiver 207, and an STBC determining unit 208. In the ARQ & feedback receiver 207, "ARQ" refers to ARQ information which is either acknowledgement or non-acknowledgement, e.g. "ACK" or "NACK", and "feedback" refers to feedback information which is either "retransmission antenna information" or "STBC period sequence information". The receiving end of FIG. 2B includes an STBC demodulator 210, an equalizer 211, first to $n^{th}$ de-interleavers 212-1 to 212-N, first to $n^{th}$ packet synthesizers 213-1 to 213-N, first to $n^{th}$ channel decoders 214-1 to 214-N, first to $n^{th}$ CRC detectors 215-1 to 215-N, an ARQ & feedback transmitter 216, a buffer 217, and a channel estimator 218. In the ARQ & feedback transmitter 216, "ARQ" refers to ARQ information which is either "ACK" or "NACK", and "feedback" refers to feedback information which is either "retransmission antenna information" or "STBC period sequence information".

In FIG. 2A, the packet data block generator 201 receives the ARQ (ACK/NACK) information and the retransmission antenna information (or the STBC period sequence information) from the ARQ & feedback receiver 207, and thus generates 1 to N packet data blocks to be transmitted at a current frame. The generated packet data blocks are respectively output to the CRC adders 202-1 to 202-N. The generated packet data block may include a new packet or a retransmission packet which is retransmitted when packet transmission has been failed in a previous time period. By the use of the aforementioned information (i.e., the ARQ (ACK/NACK) information and the retransmission antenna information (or the STBC period sequence information)), the packet data block generator 201 selects a retransmission antenna through which the packet is retransmitted. Specifically, when an ACK signal is received after a packet is transmitted in a previous time period, a new packet is transmitted in a current time period. In contrast, when an NACK signal is received after a packet is transmitted in a previous time period, the receiving end selects an antenna by using retransmission antenna information and retransmits the packet through the selected antenna. If STBC period sequence information is used, the packet is retransmitted in the same manner as it is previously transmitted.

The CRC adders 202-1 to 202-N add CRC bits to the input packet data blocks, and transmit the packet data added with the CRC bit to the channel encoders 203-1 to 203-N.

The channel encoders 203-1 to 203-N perform channel coding on the input packet data at a particular coding rate, and transmit the encoded data (bits or symbols) to the interleavers 204-1 to 204-N. If k pieces of input data are received at a coding rate R, then a total number of output symbols is k/R. The channel encoders 203-1 to 203-N may be convolutional encoders, turbo encoders, Low Density Parity Check (LDPC) encoders, and so on.

The interleavers 204-1 to 204-N interleave the data encoded by the channel encoders 203-1 to 203-N so that the data is not affected by burst errors, and transmit the interleaved data to the data modulators 205-1 to 205-N. That is, in order to improve channel throughput, the interleavers 204-1 to 204-N change the order of bits included in a packet.

The data modulators 205-1 to 205-N modulate the interleaved symbols according to a particular modulation scheme (modulation order), and transmit the modulated symbols to the STBC modulator 206. In this case, complex symbols are output by performing signal point mapping on a constellation based on a particular mapping scheme. Some examples of the modulation scheme include a Binary Phase Shift Keying (BPSK) method in which one bit (s=1) is mapped to one complex signal, a Quadrature Phase Shift keying (QPSK) method in which two bits (s=2) are mapped to one complex signal, an 8ary Quadrature Amplitude Modulation (8 QAM) method in which three bits (s=3) are mapped to one complex signal, and a 16 QAM method in which four bits (s=4) are mapped to one complex signal.

The STBC modulator 206 modulates the received symbols according to STBC information. If the STBC information is not received from the STBC determining unit 208, the STBC modulator 206 outputs the received symbols without performing modulation. The modulated symbols are subject to an Inverse Fast Fourier Transform (IFFT) process and a Radio Frequency (RF) process, and then are transmitted over the air through a corresponding antenna.

The ARQ & feedback receiver 207 receives from the receiving end the ARQ (ACK/NACK) information and the retransmission antenna information (or STBC period sequence information). The received information is output to the packet data block generator 201. Furthermore, the ARQ & feedback receiver 207 outputs the received STBC period sequence information to the STBC determining unit 208.

According to the received STBC period sequence information, the STBC determining unit 20 determines an STBC, and outputs information on the determined STBC to the STBC modulator 206.

Now, the receiving end of FIG. 2B will be described. The STBC demodulator 210 receives first to $n^{th}$ signals 1 to N through corresponding antennas, wherein the N signals have been demodulated according to a particular demodulation scheme. Then, the STBC demodulator 210 performs STBC demodulation on the received signals 1 to N. The STBC demodulation may be performed according to STBC demodulation information which uses the STBC period sequence information transmitted to the transmitting end when packet retransmission is necessary due to errors occurring in previous transmission.

The equalizer 211 performs channel compensation on the input signals 1 to N by using a channel estimation value received from the channel estimator 218. The channel-compensated signals are respectively transmitted to the de-interleavers 212-1 to 212-N. As a result, various noises generated from a communication channel can be compensated for. Throughput information (i.e., channel information) of the equalizer 211 is output to the ARQ & feedback transmitter 216.

It will be assumed herein that, among N signals to be received, if the equalizer 211 successfully receives one signal by using a Successive Interference Cancellation (SIC) scheme, probability of receiving the remaining signals increases. The SIC scheme uses a fact that a signal detection probability increases by canceling interference of a signal received from another antenna when the signal is known. This is possible because interference of the signal received from another antenna is a major cause of error occurrence in the MIMO system. Generally, in the MIMO system, an Ordered Successive Interference Cancellation (OSIC) scheme is used in which, when N signals are simultaneously received, these signals are sorted in descending order of a Signal to Noise ratio (SNR), a signal having a high probability of successful detection is first detected, and the detected signal component is removed from a next signal, thereby enhancing a signal detection success probability.

The de-interleavers 212-1 to 212-N de-interleave the signals input from the equalizer 211 according to a particular rule, so that the order of bits included in the modulated signals change into the original order. The resultant signals are output to the packet synthesizers 213-1 to 213-N.

The packet synthesizers 213-1 to 213-N combine the de-interleaved signals with packets which have been failed to be transmitted in the previous time period. The de-interleaved signals are output to the channel decoders 214-1 to 214-N. If the de-interleaved signals correspond to new packets rather than retransmission packets when retransmission is necessary due to the erroneous packets, the input signals are output without alteration.

The channel decoders 214-1 to 214-N decode the encoded data, thereby restoring the data as it was before encoding. That is, according to a decoding scheme corresponding to the encoding scheme used in the transmitting end, the data is subject to channel decoding, thereby being restored as original packet data. The restored packet data is output to the CRC detectors 215-1 to 215-N.

The CRC detectors 215-1 to 215-N detect errors from input packet data. The error detection result is transmitted to the ARQ & feedback transmitter 216. Erroneous packets are transmitted to the buffer 217.

According to the error detection result, the ARQ & feedback transmitter 216 feeds back an ACK/NACK signal to the transmitting end. That is, if no error is detected from the packet data, the ACK signal is fed back to the transmitting end. Otherwise, the NACK signal is transmitted to the transmitting end. Furthermore, the ARQ & feedback transmitter 216 computes weights of transmitting antennas and weights of erroneous packets by using the throughput information (i.e., channel information) of the equalizer 211. According to the computation result, transmission antenna information for the erroneous packets is generated. The generated information is combined with the NACK signal and is then fed back to the transmitting end. It will be assumed herein that the ACK/NACK signal is fed back without error. If all transmitting antennas have the same weight, the ARQ & feedback transmitter 216 combines an STBC period sequence information depending on an STBC structure with the NACK signal, and then feeds back the resultant signal to the transmitting end.

The buffer 217 buffers the erroneous packets received from the CRC detectors 215-1 to 215-N so that the erroneous packets are combined with retransmission packets. Upon receiving the retransmission packets, the erroneous packets are transmitted to the packet synthesizers 213-1 to 213-N.

The channel estimator 218 estimates a channel by using preambles of the signals 1 to N output from the STBC demodulator 210. The estimated channel is transmitted to the equalizer 211.

Figure 3:
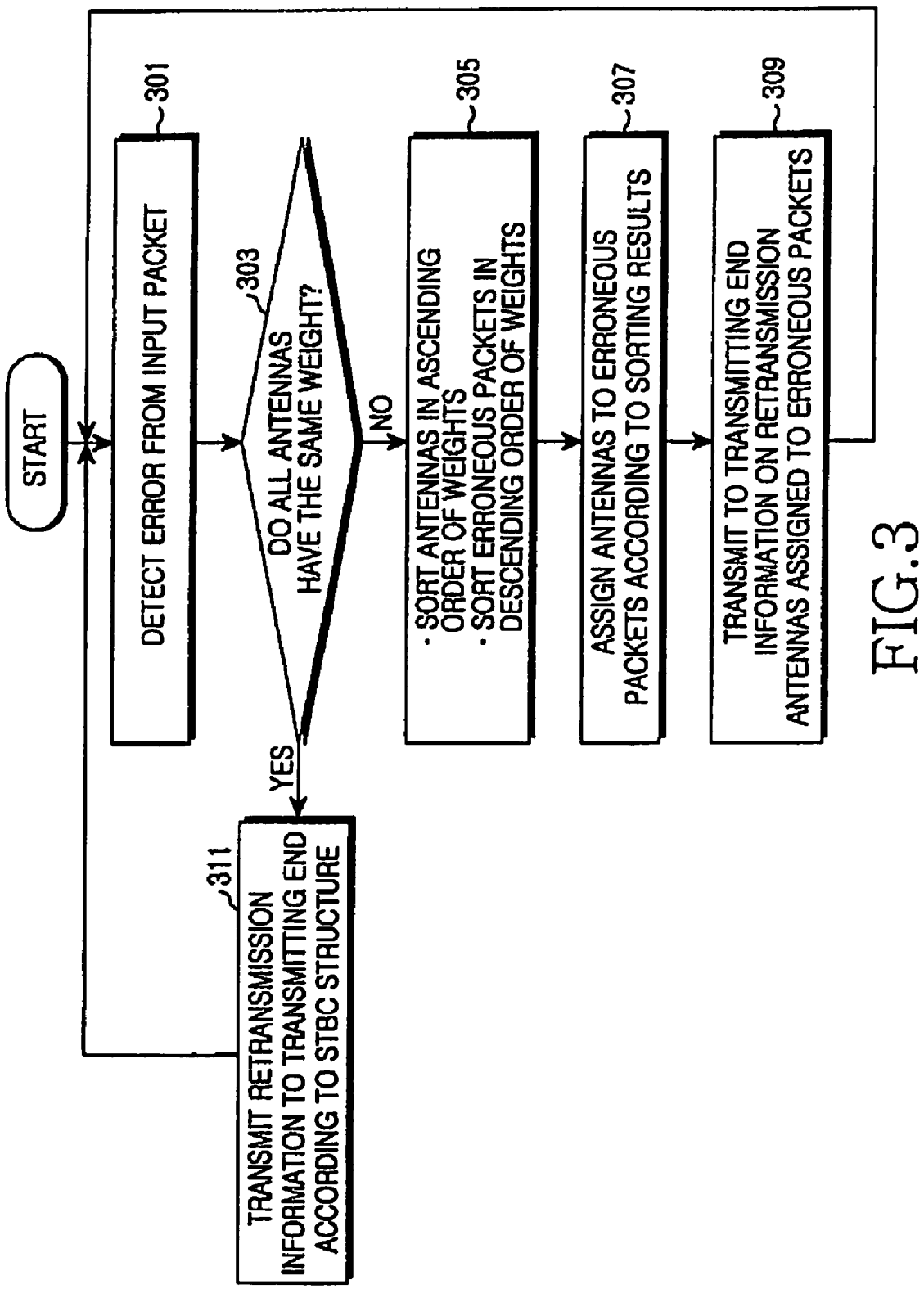
FIG. 3 is a flowchart illustrating an ARQ method in a MIMO system according to the present invention.

FIG. 3 shows an ARQ method in a MIMO system according to the present invention.

It will be assumed that a transmitting end transmits packets $X_1, X_2$, and $X_3$ to a receiving end at time t−1 through antennas 1, 2, and 3, respectively, and transmits a retransmission packet for the packet $X_2$ and new packets $X_4$ and $X_5$ to the receiving end at time t through the antennas 1, 2, and 3, respectively. Further, retransmission packets for the packets $X_2$ and $X_5$ and a new packet $X_6$ are transmitted to the receiving end at time t+1 through the antennas 1, 2, and 3, respectively.

Signals finally received by the receiving end at time t+1 are obtained by combining retransmission packets with previously received packets, and can be expressed by Equation (2) below. It will be assumed herein that a channel does not change for a certain time period.

$$Y(t+1) = \begin{bmatrix} H_2 \\ H_1 \\ H_{P_1} \end{bmatrix} X_2 + \begin{bmatrix} 0 \\ H_3 \\ H_{P_2} \end{bmatrix} X_5 + \begin{bmatrix} 0 \\ 0 \\ H_{P_3} \end{bmatrix} X_6 + N(t+1) \quad (2)$$

$$= \begin{bmatrix} H_2 & 0 & 0 \\ H_1 & H_3 & 0 \\ H_{P_1} & H_{P_2} & H_{P_3} \end{bmatrix} \begin{bmatrix} X_2 \\ X_5 \\ X_6 \end{bmatrix} + N(t+1)$$

Equation (2) shows that the packet $X_2$ is transmitted to the receiving end at time t−1 through the antenna 2, is retransmitted at time t through the antenna 1, and is retransmitted at time t+1 through an antenna $P_1$ selected from the antennas 1, 2, and 3. Further, the packet $X_5$ is transmitted through the antenna 3 at time t, and is retransmitted through an antenna $P_2$ selected from the antennas 1, 2, and 3 at time t+1. Furthermore, the packet $X_6$ is transmitted through an antenna $P_3$ selected from the antennas 1, 2, and 3 at time t+1.

Packet retransmission can be made in the most effective way when the transmitting end retransmits erroneous packets through $N_A$ antennas such that the average of estimated error dispersion of streams is minimized. According to the present invention, a water filling process is used to minimize an estimated error of streams, and thus the average of estimated error dispersion of streams will be minimized. The water filling process is derived from a concept that a certain amount of water is poured into a vessel having an uneven bottom surface. In order for the estimated errors of streams to have a constant value, the present invention provides a method in which weights of erroneous packets are sorted in descending order, weights of antennas are sorted in ascending order, and antenna retransmission information is transmitted to the transmitting end according to the sorting results. The antenna retransmission information indicates antennas to which erroneous packet are assigned. With this method, when an error is detected in a packet previously transmitted through a poor antenna, a good antenna is selected so the packet is transmitted through the good antenna in the next transmission.

Referring to FIG. 3, in step 301, the receiving end evaluates input packets to determine whether errors are detected from the input packets. The input packet may either be an initially transmitted packet or a retransmitted packet. The retransmitted packet is received when packet transmission has been failed in a previous time period. When the retransmission packet is input, the retransmission packet is combined with the previously transmitted packet which has been failed to be transmitted, and the combined packet is evaluated to detect errors. The subsequence steps described below will be performed under the assumption that an error has been detected from the input packet.

In step 303, weights of all transmitting antennas are determined to know whether the transmitting antennas have the same weight. A weight of an $i^{th}$ transmitting antenna may be determined using channel information for a packet to be retransmitted at a next time period. Under the assumption that a channel does not change for a certain time period, the weight of the transmitting antenna can be expressed by Equation (3) below by using the current channel information.

$$W(A_i) = \|H_{P_i}\|^2 \quad (3)$$

If the weights of all transmitting antennas are different from one another, the weights of the transmitting antennas are sorted in ascending order, and the weights of the erroneous packets are sorted in descending order in step 305. The weights of the erroneous packets may be determined by using channel information from a pervious time period to a current time period, and can be expressed by Equation (4) below.

$$W(E_i) = \|H_i\|^2 \quad (4)$$

If the same assumption as in Equation (2) above is applied to Equation (4), a weight of each erroneous packet can be expressed by Equation (5) below.
$$W(E_2) = \|H_2\|^2 = \|H_2\|^2 + \|H_1\|^2$$

$$W(E_5) = \|H_5\|^2 = \|H_3\|^2 \quad (5)$$

Figure 4A:
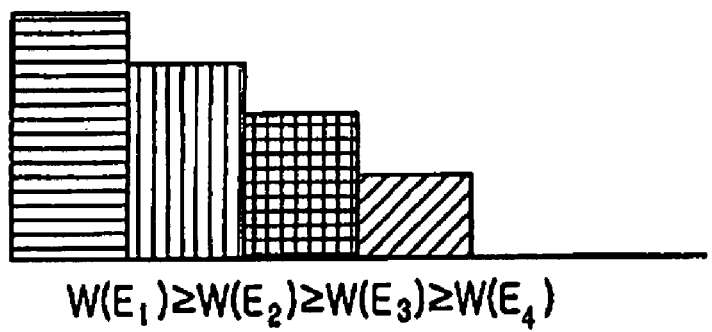
FIGS. 4A to 4C illustrate examples of a method of selecting a retransmission antenna according to the present invention.
Figure 4B:
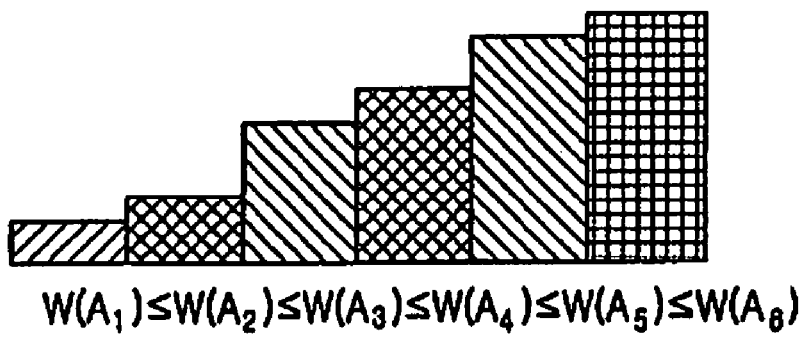
Figure 4C:
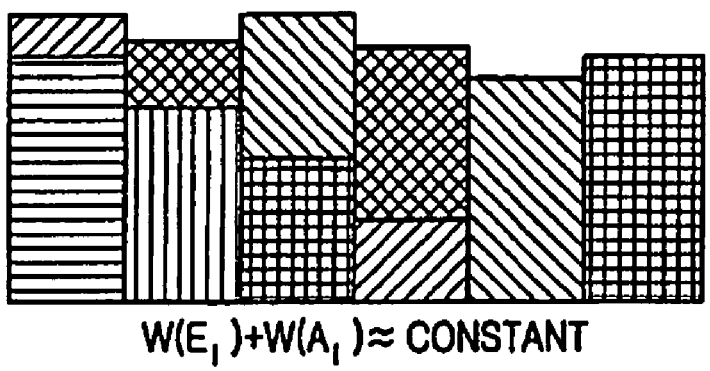

In step 307, the antennas are assigned to the erroneous packets according to the above sorting results. In FIGS. 4A to 4C, the erroneous packets are sorted in descending order of weights, as shown in FIG. 4A. The transmitting antennas are sorted in ascending order of weights, as shown in FIG. 4B. According to the sorting results, the transmitting antennas are assigned to the erroneous packets, as shown in FIG. 4C so the sum of weights of the erroneous packets and the transmitting antennas are constant.

In step 309, information on a retransmission antenna assigned to the erroneous packet is transmitted to the transmitting end. The retransmission antenna information includes an identifier for the erroneous packet and information on a retransmission antenna through which the erroneous packet is retransmitted. Then, the procedure returns to step 301.

If the result of step 303 show that the weights of all transmitting antennas are equal to one another, the procedure proceeds to step 311. In step 311, according to a $N_A \times N_A$ STBC structure, retransmission information (i.e., an identifier for the erroneous packet and an STBC time period sequence) is transmitted to the transmitting end. The procedure is then returned to step 301.

The STBC may be a full rate quasi-orthogonal code which can be expressed by Equation (6) below.

$$\begin{bmatrix} x_1 & -x_2^* & -x_3 & x_4^* \\ x_2 & x_1^* & x_4 & x_3^* \\ x_3 & -x_4^* & x_1 & -x_2^* \\ x_4 & x_3^* & -x_2 & -x_1^* \end{bmatrix} \quad (6)$$

The full rate quasi-orthogonal code represents a coding matrix of packets transmitted through four transmitting antennas. $x_1$, $x_2$, $x_3$, and $x_4$ denote four input packets to be transmitted. In the matrix of Equation (6), the number of rows corresponds to the number of transmitting antennas, and the number of columns corresponds to a time period for transmitting the four packets. For example, the input packet $x_1$ may be transmitted through a first receiving antenna at time t, be retransmitted through a second transmitting antenna at time t+1 in the format of $x_1^*$, be retransmitted through a third transmitting antenna at time t+2 in the format of $x_1$, and be retransmitted through a fourth transmitting antenna at time t+3 in the format of $-x_1^*$.

The time period sequence is used to represent the STBC by using a symbol as expressed by Equation (7) below.

$$(b, \rho_i, s_i) \quad (7)$$

b denotes whether packet conjugation is needed when a packet is retransmitted. b is set to 1 when packet conjugation is needed, otherwise b is set to 0. $\rho_i$ denotes a permutation method that is either $\rho_1(1,2,3,4)=(2,1,4,3)$ or $\rho_2(1,2,3,4)=(4,3,2,1)$. When using the permutation method $\rho_1(1,2,3,4)=(2,1,4,3)$, first and second packets respectively transmitted through first and second antennas are transmitted in a next time period by switching the antennas, that is, respectively through the second and first antennas. Likewise, third and fourth packets respectively transmitted through third and fourth antennas are transmitted in a next period by switching the antennas, that is, respectively through the fourth and third antennas. When using the permutation method $\rho_2(1,2,3,4)=(4,3,2,1)$, first, second, third, and fourth packets respectively transmitted through first, second, third, and fourth antennas are transmitted in a next time period by reversing the order of the antennas, that is, respectively through the fourth, third, second, and first antennas. $s_i$ denotes a sign (i.e., plus or minus) applied to the retransmission packet. For example, the signal may be $s_1=(-1, 1, -1, 1)$ or $s_2=(1, 1, -1, -1)$. 1 indicates that a sign used in a previously transmitted packet is also applied to a current transmitted packet. −1 indicates that a sign used in a previously transmitted packet is inversely applied to a current transmitted packet. Thus, the time period sequences for indicating the full rate quasi-orthogonal code of Equation (7) above are $(1,\rho_1,s_1)$, $(1,\rho_2,s_2)$, $(0,\rho_1,s_1)$, and $(0,\rho_2,s_2)$. According to the STBC structure, the receiving end transmits one of the four time period sequences to the transmitting end.

In this case, by using the time period sequence, the transmitting end encodes an initially transmitted packet and a retransmission packet which is retransmitted when packet transmission has been failed in a previous time period, and transmits the packets to the receiving end. This can be expressed by Equation (8) below.

$$\begin{bmatrix} x_1 & -x_5^* & -x_3 & x_6^* \\ x_2 & x_1^* & x_6 & x_3^* \\ x_3 & -x_6^* & x_1 & -x_5^* \\ x_4 & x_3^* & -x_5 & -x_7^* \end{bmatrix} \quad (8)$$

It is assumed herein that the transmitting end transmits the packets $x_1$, $x_2$, $x_3$, and $x_4$ respectively through first, second, third, and fourth antennas in a first time period, and thereafter the receiving end requests the transmitting end to retransmit the packets $x_1$ and $x_2$. In this case, the transmitting end encodes new packets $x_5$ and $x_6$ and the packets $x_1$ and $x_2$ in a second time period by using time period sequence information for retransmission, and transmits the encoded packets to the receiving end. If the receiving end requests the transmitting end to retransmit all packets that have been transmitted in the second time period, the transmitting end encodes the packets in a third time period by using the time period sequence information for retransmission and transmits the encoded packets to the receiving end. Thereafter, if the receiving end requests the transmitting end to retransmit the packets $x_3$, $x_5$, and $x_6$, the transmitting end encodes the packets and a new packet $x_7$ in a fourth time period by using the time period sequence information for retransmission, and transmits the encoded packets to the receiving end.

Figure 5:
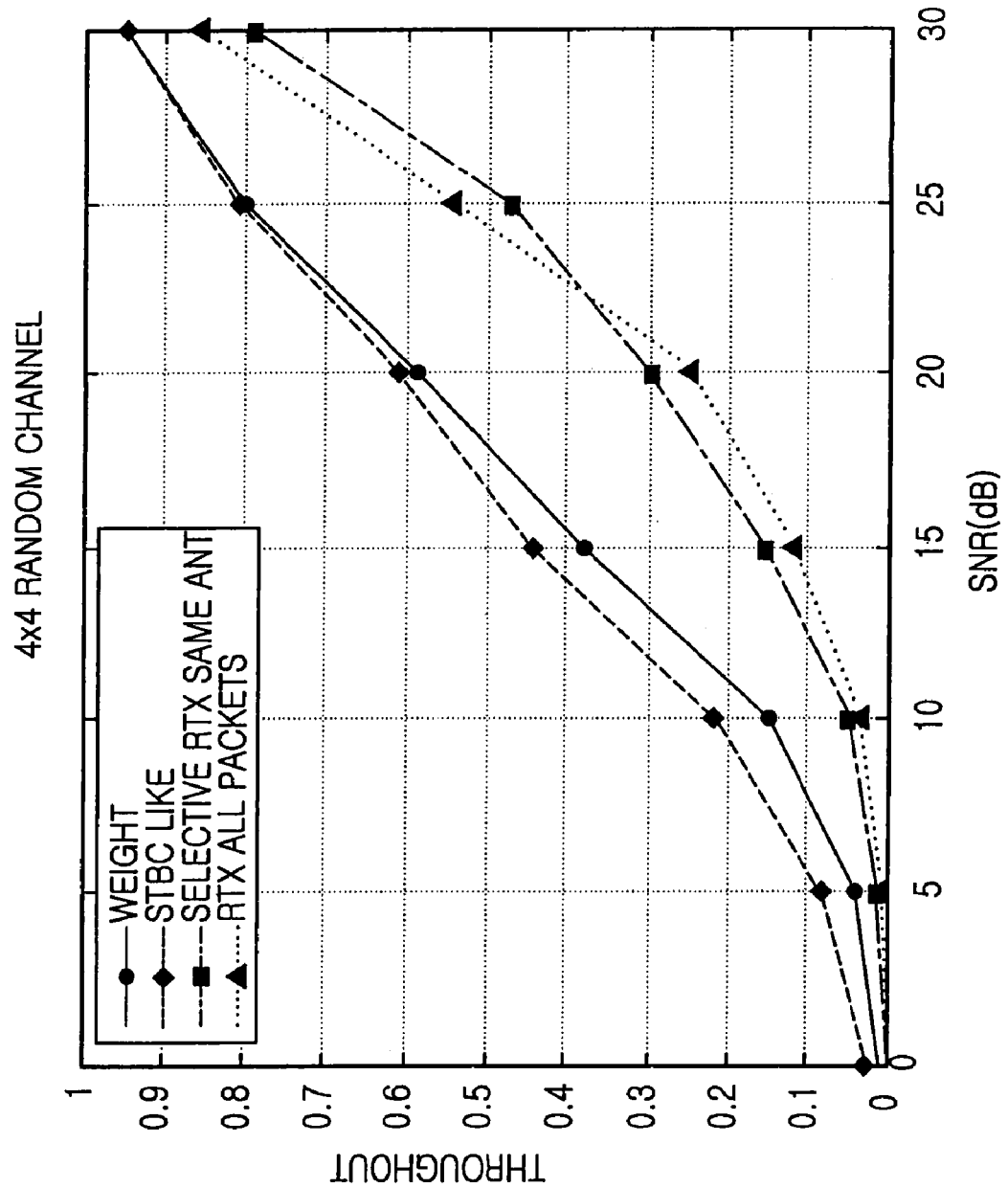
FIG. 5 and FIG. 6 are graphs for comparing throughput between the prior art and the present invention.
Figure 6:
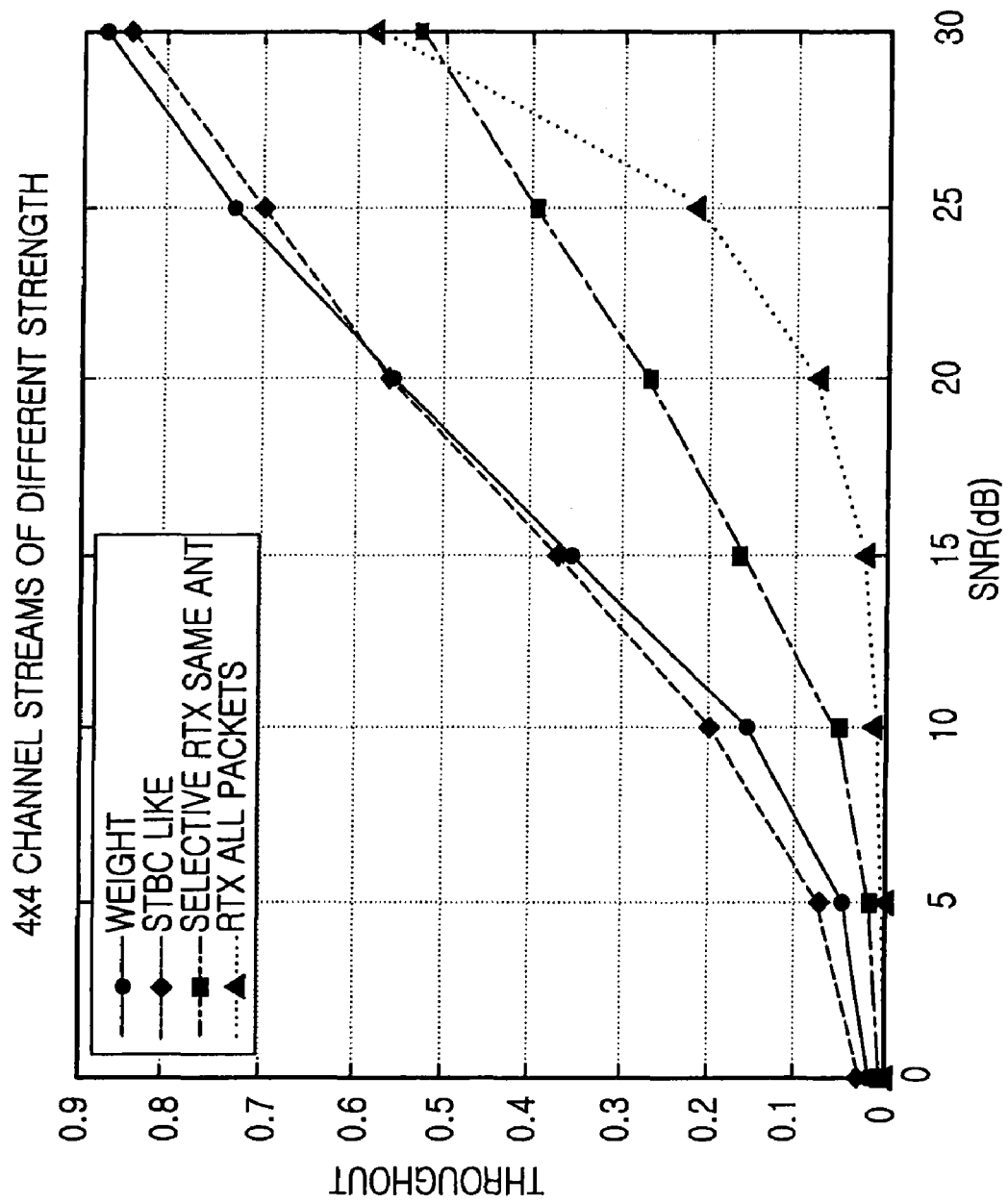

FIG. 5 and FIG. 6 are graphs for comparing throughput between the prior art and the present invention. A 4×4 MIMO system is used to obtain this comparison result, and a channel coefficient of a 4×4 matrix conforms to a normal distribution. In FIG. 5, four streams have the same weight. In FIG. 6, four streams have different weights from one another.

In the graphs of FIG. 5 and FIG. 6, "weight" indicates throughput in a case where a packet is retransmitted in consideration of weights of antennas and weights of erroneous packets according to an embodiment of the present invention. "STBC like" indicates throughput in a case where a packet is retransmitted according to a 4×4 quasi orthogonal STBC. "Selective Rtx Same Ant" indicates throughput in a case where an erroneous packet is retransmitted to an antenna through which the packet has previously been transmitted according to the prior art. "Rtx All Packets" indicates throughput in a case where all packets are retransmitted through the same antenna. The graphs of FIG. 5 and FIG. 6 show that the present invention can provide better throughput than the prior art in terms of "weight" and "STBC like".

Although it has been described that the receiving end selects an antenna used for packet retransmission, the antenna may be selected by the transmitting end if a channel state does not frequently change and Channel State Information (CSI) can be fed back.

According to the present invention, in a receiving end of a MIMO system, erroneous packets are sorted in descending order of weights and transmitting antennas are sorted in ascending order of weights. Then, the antennas are assigned to the erroneous packets in consideration of the sorting result. Information on the antenna assignment is transmitted to the transmitting end, and by the use of the information, an antenna used for packet retransmission is selected. Therefore, an error rate of retransmitted data can be minimized by using an ARQ method. Furthermore, the number of times of performing retransmission is reduced, thereby increasing overall data throughput.

While the invention has been shown and described with reference to certain preferred embodiments thereof, it will be understood by those skilled in the art that various changes in form and details may be made therein without departing from the spirit and scope of the invention as defined by the appended claims and their equivalents. Therefore, the scope of the invention is defined not by the detailed description of the invention but by the appended claims and their equivalents, and all differences within the scope will be construed as being included in the present invention.

What is claimed is:

1. A method of selecting a retransmission antenna in a Multi Input Multi Output (MIMO) system, the method comprising:
   computing weights of erroneous packets and weights of transmitting antennas by using channel information;
   sorting the weights of the erroneous packets in descending order;
   sorting the weights of the transmitting antennas in ascending order; and
   assigning the transmitting antennas to the erroneous packets according to sorting results.

2. The method of claim 1, wherein the weights of the transmitting antennas are computed according to:

$$W(A_i) = \|H_{P_i}\|^2,$$

where $H_{P_i}$ denotes channel information for a packet to be transmitted in a next time period, and wherein the weight of the transmitting antenna is computed by regarding the channel information $H_{P_i}$ as current channel information under an assumption that a channel does not change for a certain time period.

3. The method of claim 1, wherein the weights of the erroneous packets are expressed by:

$$W(E_i) = \|H_i\|^2,$$

where $H_i$ denotes channel information for the erroneous packet from a previous time period to a current time period.

4. The method of claim 1, further comprising transmitting information on the antenna assignment to a transmitting end.

5. The method of claim 4, wherein the antenna assignment information comprises an identifier for at least one of an erroneous packet and information on a retransmission antenna through which the erroneous packets are retransmitted.

6. The method of claim 1, further comprising transmitting retransmission antenna information to a transmitting end according to a Space-Time Block Code (STBC) structure when the antennas have the same weight.

7. The method of claim 6, wherein the retransmission antenna information comprises an identifier for at least one of an erroneous packet and time period sequence information.

8. The method of claim 7, wherein the time period sequence information is expressed by $$(b, \rho_i, s_i),$$

where b denotes whether packet conjugation is needed when a packet is retransmitted, $\rho_i$ denotes a permutation method for a packet retransmitted through each antenna, and $s_i$ denotes a sign (i.e., plus or minus) applied to the retransmitted packet.

9. An apparatus for selecting a retransmission antenna in a Multi Input Multi Output (MIMO) system, the apparatus comprising:
a Cyclic Redundancy Check (CRC) detector for detecting an error from an input packet; and
an Automatic Repeat reQuest (ARQ) transmitter for computing weights of erroneous packets and weights of transmitting antennas by using channel information, for sorting the weights of the erroneous packets in descending order, for sorting the weights of the transmitting antennas in ascending order, for assigning the transmitting antennas to the erroneous packets according to sorting results, and for transmitting information on an antenna assignment to a transmitting end.

10. The apparatus of claim 9, further comprising a packet synthesizer for combining a retransmitted packet and a packet failed to be received in a previous time period and for outputting the combined packet.

11. The apparatus of claim 9, wherein the weights of the transmitting antennas are computed according to:

$$W(A_i) = \|H_{P_i}\|^2,$$

where $H_{P_i}$ denotes channel information for a packet to be transmitted in a next time period, and wherein the weight of the transmitting antenna is computed by regarding the channel information $H_{P_i}$ as current channel information under the assumption that a channel does not change for a certain time period.

12. The apparatus of claim 9, wherein the weights of the erroneous packets are expressed by:

$$W(E_i) = \|H_i\|^2,$$

where $H_i$ denotes channel information for the erroneous packet from a previous time period to a current time period.

13. The apparatus of claim 9, wherein the antenna assignment information comprises an identifier for at least one of an erroneous packet and information on a retransmission antenna through which the erroneous packets are retransmitted.

14. The apparatus of claim 9, wherein the ARQ transmitter transmits retransmission antenna information to the transmitting end according to a Space-Time Block Code (STBC) structure when the antennas have the same weight.

15. The apparatus of claim 14, wherein the retransmission antenna information comprises an identifier for at least one of an erroneous packet and time period sequence information.

16. The apparatus of claim 15, wherein the time period sequence information is expressed by $$(b, \rho_i, s_i)$$

where b denotes whether packet conjugation is needed when a packet is retransmitted, $\rho_i$ denotes a permutation method for a packet retransmitted through each antenna, and $s_i$ denotes a sign (i.e., plus or minus) applied to a retransmitted packet.

17. An apparatus for selecting a retransmission antenna in a Multi Input Multi Output (MIMO) system, the apparatus comprising:
means for sorting weights of the erroneous packets in descending order;
means for sorting weights of transmitting antennas in ascending order; and
means for assigning the transmitting antennas to the erroneous packets according to sorting results.

18. The apparatus of claim 17, wherein the weights of the transmitting antennas are computed according to:

$$W(A_i) = \|H_{P_i}\|^2,$$

where $H_{P_i}$ denotes channel information for a packet to be transmitted in a next time period, and wherein the weight of the transmitting antenna is computed by regarding the channel information $H_{P_i}$ as current channel information under an assumption that a channel does not change for a certain time period.

19. The apparatus of claim 17, wherein the weights of the erroneous packets are expressed by:

$$W(E_i) = \|H_i\|^2,$$

where $H_i$ denotes channel information for the erroneous packet from a previous time period to a current time period.

* * * * *